June 23, 1942.  M. B. WRIGHT, SR  2,287,217
MOISTURE ABSORBING APPARATUS
Filed Feb. 27, 1939  2 Sheets-Sheet 1
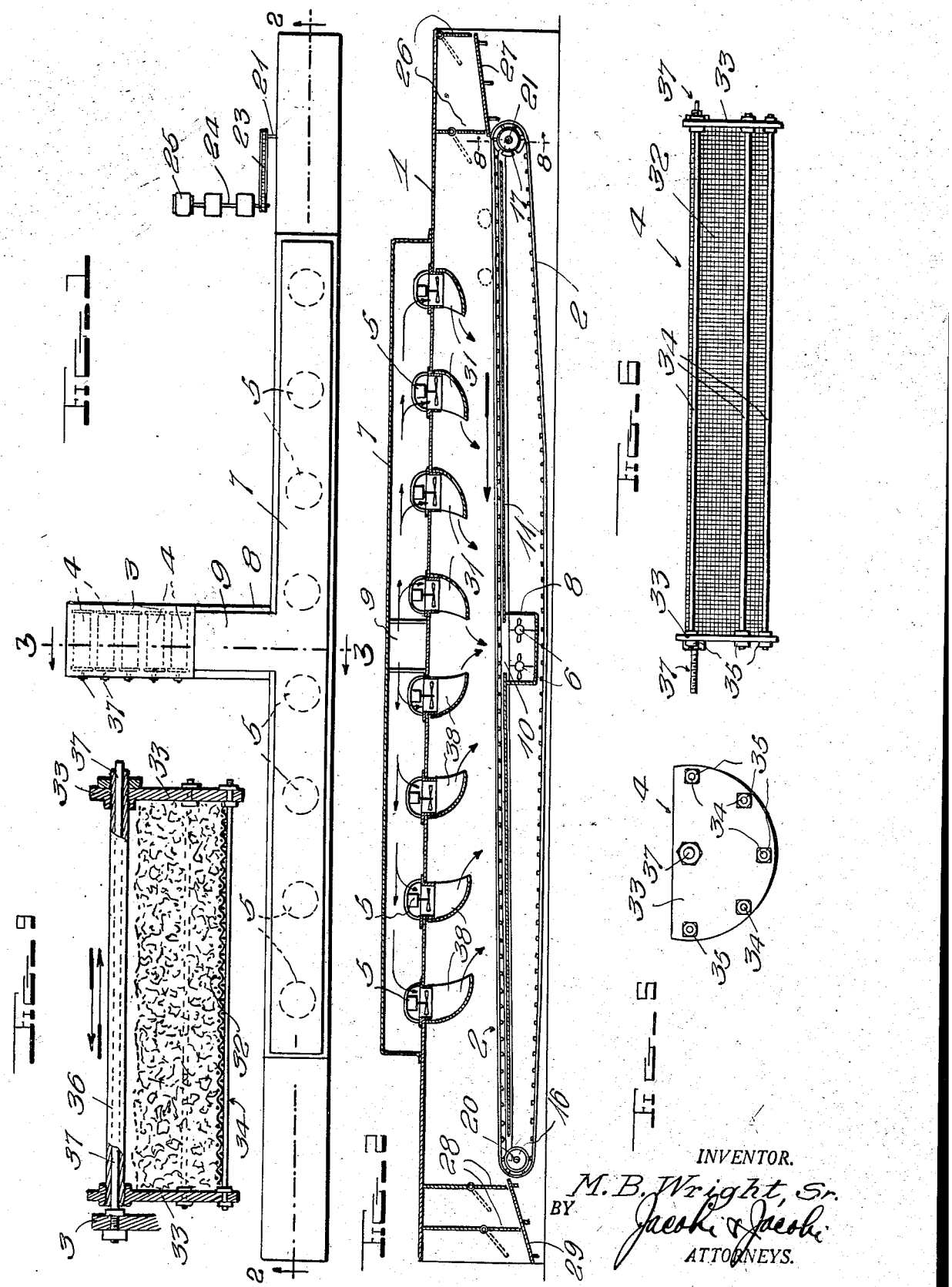
INVENTOR.
M. B. Wright, Sr.
BY Jacobi & Jacobi
ATTORNEYS.

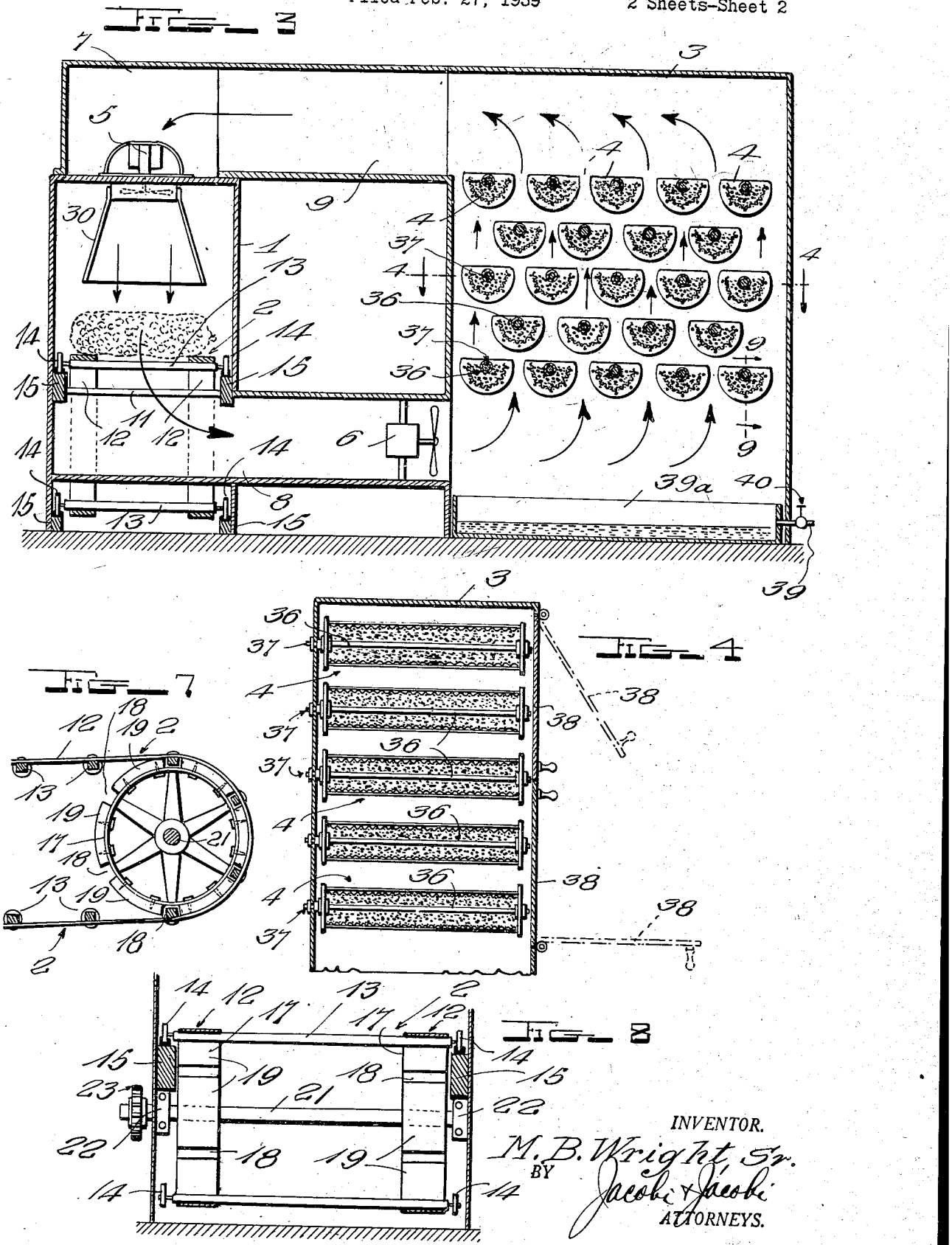

Patented June 23, 1942

2,287,217

UNITED STATES PATENT OFFICE 2,287,217

MOISTURE ABSORBING APPARATUS

Malcolm B. Wright, Sr., Hammond, La., assignor of one-half to Sidney Perkins, Hammond, La.

Application February 27, 1939, Serial No. 258,807

2 Claims. (Cl. 183—4)

This invention relates to a drier which is particularly adapted for drying white potatoes but may be used for drying other vegetables, fruits, or the like.

Before potatoes and certain other vegetables are packed and shipped to market, they must be washed and then thoroughly dried so that they will not be damaged by mold or the like due to the presence of moisture.

At the present time, it is customary to employ refrigeration in order to dry potatoes after they have been washed but this has been found unsatisfactory as the chilled potatoes are colder than the surrounding atmosphere when removed from the refrigerating apparatus and sweating takes place as moisture in the warmer air condenses upon the potatoes.

Therefore, it is one object of the invention to provide a drying apparatus wherein refrigeration is eliminated and the potatoes dried by circulation of air from which the moisture contents has been removed by subjecting the air to the action of calcium chloride, the air being circulated through a drying chamber and sacked potatoes being moved through the chamber at such speed that the potatoes will be thoroughly dried.

Another object of the invention is to provide a drying apparatus wherein the calcium chloride is the sole means depended upon for removing moisture from the circulating air, the calcium chloride being readily obtainable at small cost and capable of being stored without deteriorating. It will thus be seen that the drier may be operated at small cost and an expensive refrigerating plant eliminated.

Another object of the invention is to provide an improved arrangement of drying chamber and a chamber wherein moisture is removed from the circulating air by the action of calcium chloride, the calcium chloride being held in containers removably mounted in the moisture removing chamber and so arranged therein that moisture will be removed from the air in a very efficient manner.

Still another object of the invention resides in providing a device which is simple and durable in construction, inexpensive to manufacture and one which will be very efficient in operation and application to use.

With this and numerous other objects in view, my invention consists in the novel features of construction, combination and arrangement of parts as will be hereinafter referred to and more particularly pointed out in the specification and claims.

The invention is illustrated in the accompanying drawings wherein:

Figure 1 is a top plan view of the improved drying apparatus.

Figure 2 is a sectional view taken longitudinally through the drying chamber along the line 2—2 of Figure 1.

Figure 3 is a sectional view upon an enlarged scale taken transversely through the drying apparatus along the line 3—3 of Figure 1.

Figure 4 is a horizontal sectional view taken along the line 4—4 of Figure 3.

Figure 5 is an end view of one of the containers for calcium chloride.

Figure 6 is a side elevation of a calcium chloride container.

Figure 7 is a sectional view upon an enlarged scale showing the drive pulley and a portion of the endless belt by means of which sacks of potatoes are moved through the drying chamber.

Figure 8 is a sectional view upon an enlarged scale taken along the line 8—8 of Figure 1.

Figure 9 is a fragmentary sectional view upon an enlarged scale taken along the line 9—9 of Figure 3.

This improved drying apparatus consists briefly of an elongated drying chamber 1 through which the potatoes or other products to be dried pass, an endless conveyor 2 for moving the bags of potatoes through the drying chamber, an auxiliary chamber 3 housing the containers 4 for holding calcium chloride or an equivalent moisture absorbing medium, and fans 5 and 6 for circulating air which passes through the drying chamber 1 and the moisture collecting chamber 3 and through the upper and lower air passages or tunnels 7 and 8. The upper air passage is in the form of a manifold extending longitudinally of the chamber 1 and provided with a neck 9 extending to and communicating with the upper portion of the chamber 3 and the lower air passage 8 extends from the lower portion of the chamber 3 and under the chamber 1 in enclosing relation to an opening 10 formed in the plate 11 which serves as a platform over which moves the upper flight of the conveyor.

The conveyor consists of transversely spaced belts 12 secured to cross bars 13 which project from the belts as shown in Figure 5 and at their ends carry wheels or rollers 14 for resting upon and moving along tracks 15 carried by side walls of the drying chamber. The belts pass about rollers 16 and 17 extending transversely through end portions of the drying chamber and as the belts pass about the rollers, the cross bars engage in the spaces 18 between the cleats or blocks fixed to peripheries of the rollers. The shafts 20 and 21 for the rollers are rotatably mounted in bearings 22 carried by the upper tracks and the shaft 21 has one end portion protruding from a side of the casing and provided with a sprocket wheel 22 for engagement by a sprocket chain 23. This chain 23 is trained about a sprocket wheel carried by a shaft 24 upon which is also mounted a pulley 25 so that rotary motion may be transmitted to it from a motor or other suitable source of power, and it will be readily understood that when the drive shaft 24 is rotated rotary motion will be transmitted to the shaft 21 and motion imparted to the conveyor for shifting bags of potatoes through the drying chamber longitudinally thereof. As the cross bars fit into the spaces 18 and are engaged by the blocks 19, motion will be positively imparted to the conveyor and slippage prevented between the rollers and the conveyor.

It is desired to prevent air from entering the drying chamber through the inlet end thereof and also prevent escape of air from its outlet end. In order to do so, there have been provided doors 26 over the platform 27 at the entrance end of the drying chamber and similar doors 28 over the discharge platform 29. These doors are disposed vertically and pivotally mounted at their upper ends so that they normally remain closed and will be moved to a closed position by gravity as bags pass under them. The platform 27 slopes downwardly towards the conveyor so that a bag of potatoes placed thereon will easily slide toward and onto the conveyor and the platform 29 slopes toward the outlet end of the chamber so that when a bag of potatoes is moved onto it from the conveyor, it will slide along the discharge platform and out of the drying chamber.

During use of this drying apparatus, bags of potatoes are thrust inwardly under the doors 26 and along the platform 27 onto the upper flight of the conveyor over the platform 11. The conveyor moves the bags through the drying chamber longitudinally thereof and discharges them onto the platform 29, along which they pass under the doors 28. During this movement of the bags of washed potatoes, they are subjected to the action of air which is circulated through the drying chamber by the fans 5 and 6. The air enters the drying chamber through the openings in the top thereof and since these openings and the fans 5 are distributed longitudinally of the drying chamber and arranged in groups having deflectors 30 and 31 associated therewith and directed toward the mid-section of the chamber where the opening 10 is located, the air will be caused to flow longitudinally in the chamber toward the opening 10. The air passing from the deflectors 31 acts upon the upper and rear portions of the bags of potatoes and the air flowing from the deflectors 30 acts upon the upper and front portions of the bags of potatoes. Air will also flow along the platform 11 under the bags of potatoes and some of the air will pass through the bags. Therefore, the potatoes in the bags will be thoroughly acted upon by the circulating air and the potatoes thoroughly dried.

The air is sucked through the opening 10 into the tunnel 8 and from this tunnel passes into the lower portion of the absorbing chamber 3 where it passes upwardly through and around the containers 4. The calcium chloride in the containers 4 absorbs moisture in the air and the dry air passes through the tunnel or arm 9 into the manifold 7 from which it passes through the openings in the top of the drying chamber for re-circulation through the drying chamber. The conveyor moves at such a speed that as the bags of potatoes pass through the drying chamber, they will be subjected to the action of the dry air a number of times before being discharged onto the delivery platform 29 and the potatoes when delivered will be dry. As no refrigerant is employed during the drying operation, the temperature of the potatoes will not be lowered and sweating will not occur when the dried potatoes are subjected to atmospheric air.

The containers 4 are each of a trough-like formation and each has a body 32 formed of woven wire or other suitable foraminous material. Heads 33 are disposed at ends of the body where they are secured by rods 34 which extend longitudinally of the trough and have their end portions passed through the heads. Nuts 35 are employed to hold the heads firmly upon the rods. There has also been provided a tubular bar 36 extending longitudinally of the trough midway the width of the upper portion thereof and of a diameter to receive a mounting rod 37. The mounting rods 37 are carried by a side wall of the chamber 3 and project therefrom toward the opposite side of the chamber which is normally closed by doors 38. When the doors are opened, as indicated by dotted lines in Figure 6, the containers may be slid longitudinally off the rods and removed for a thorough cleaning and replenishing of the calcium chloride. Referring to Figure 5, it will be seen that the rods 37 are so mounted that the containers will be arranged in horizontally extending rows and the containers of adjoining rows will be in staggered relation to each other. Therefore, as the air moves upwardly through the chamber, proper contact of the air with the calcium chloride in the containers will be assured and moisture in the air will be taken up by the calcium chloride. A drip pan 39a for catching brine which drips from the containers is mounted in the bottom of the chamber 3 and a drain pipe 39 controlled by a valve 40 is provided for drawing off the brine when necessary.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In a drying apparatus, an absorption chamber open at its front, a hinged closure for the chamber, means for circulating air through said chamber, and means in the chamber for removing moisture from air consisting of a plurality of containers arranged in rows with the containers of one row in staggered relation to the containers of adjoining rows, supporting rods extending horizontally in said chamber and each having one end portion secured through the rear wall of the chamber, said containers having foraminous walls whereby air may pass through the containers, tubes carried by said containers longitudinally thereof and fitting about said rods to support the containers therefrom, and means in said containers for absorbing moisture from air passing through the chamber and the containers.

2. In a drying apparatus, an absorption chamber having an inlet and an outlet for air circulating through the chamber, the chamber being open at its front, a closure movable into and out of closing relation to the open front of the chamber, a plurality of containers in the chamber for holding a moisture absorbing chemical, and supporting mounting rods for the containers extending horizontally in the chamber and having their rear ends secured through the rear wall of the chamber and their free ends presented toward the open front of the chamber, said containers each having a trough-shaped body of foraminous material, end walls for the body, rods extending longitudinally of the body externally thereof and constituting braces for the body having ends secured through the ends walls, and a tube extending longitudinally in the body with its ends secured through the end walls, said mounting rods passing through the tubes of the containers to rearwardly support the containers in the chamber.

MALCOLM B. WRIGHT, Sr.